United States Patent Office 3,227,640
Patented Jan. 4, 1966

3,227,640
MANUFACTURE OF OLEFINICALLY
UNSATURATED ALCOHOLS
Robert W. Foreman, Chagrin Falls, and Franklin Veatch, University Heights, Ohio, assignors to The Standard Oil Company, Cleveland, Ohio, a corporation of Ohio
No Drawing. Filed Dec. 31, 1962, Ser. No. 248,290
13 Claims. (Cl. 204—77)

The present invention relates to a process for the manufacture of olefinically unsaturated alcohols and more particularly, pertains to the chemical-electrochemical conversion of an olefinically unsaturated aldehyde to an olefinically unsaturated alcohol in the presence of cadmium metal and an acid.

The present process is applicable to alpha, beta-olefinically unsaturated aldehydes containing from 3 to 8 carbon atoms, such as acrolein, methacrolein, crotonaldehyde and the like.

Preferably, the chemical and electrochemical reactions are carried out simultaneously in a single unit made up of a combination chemical reactor and electrochemical cell. However, it is also contemplated that the chemical reaction may be carried out in a separate reactor from the electrochemical recovery unit and the cadmium metal be transported from the electrochemical recovery unit to the chemical reactor, or the two reactions may be carried out in the same unit, but in a sequential manner. Conversions of acrolein to allyl alcohol of about 80% with essentially complete recovery of cadmium have been achieved under the preferred conditions.

A preferred chemical-electrochemical system includes the use of aqueous sulfuric acid plus traces of a catalyst, such as hydrogen iodide, as the cadmium-olefinically unsaturated aldehyde reaction medium. The use of stirred horizontal cathode and vertical anode compartments wherein a cation exchange membrane is employed to isolate the anode sections is within the scope of this invention. In the simultaneous chemical-electrochemical reaction the cadmium metal is consumed and regenerated in situ and the reaction products can be removed or isolated by simple stripping or distillation.

A detailed description of the instant chemical step appears in the copending U.S. patent application of Robert W. Foreman, Serial No. 147,170, filed October 24, 1961 now U.S. Patent No. 3,109,865. Cadmium metal is unique for the present chemical reaction. The reaction which occurs in the chemical step of this process may be represented by the following equation, wherein the acid used for illustrative purposes consists of a combination of hydrogen iodide and sulfuric acid and acrolein is a representative olefinically unsaturated aldehyde. When acrolein is employed as the starting material, the principal products are allyl alcohol and propionaldehyde, with the final product mixture being composed of approximately three moles of allyl alcohol for each mole of propionaldehyde.

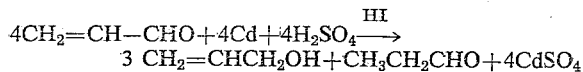

$$4CH_2=CH-CHO + 4Cd + 4H_2SO_4 \rightarrow$$
$$3 CH_2=CHCH_2OH + CH_3CH_2CHO + 4CdSO_4$$

The cadmium metal is converted to the corresponding salt, which will vary depending upon the acid employed. The hydrogen iodide, for no apparent reason, acts as a catalyst. It has been found that hydrogen bromide is also a catalyst. The cadmium metal is recovered from its salt electrochemically, as more fully described below.

The acids which have been found to be useful in the present invention are those which have an equivalent conductance in a 5% water solution at 15° C. of at least 100, and mixtures thereof. Equivalent conductance is defined as $$\frac{\text{Mhos/cm.}}{\text{gram equivalents/cc.}}$$

Examples of such acids which are embodied herein are hydrochloric, sulfuric, trifluoroacetic and other strong mineral and organic acids. Nitric acid, perchloric acid and the like are not recommended for use in the instant process because of their oxidizing properties. The use of hydrochloric acid along with a catalytic amount of hydroiodic acid, for instance, is within the scope of the present invention. Acids which have an equivalent conductance of less than 100, such as hydrofluoric acid, acetic acid and the like show no appreciable activity in the present process and are outside the scope of the present invention.

It is most preferred, therefore, that the present chemical-electrochemical process be a simultaneous process carried out in the presence of an alpha, beta-olefinically unsaturated aldehyde, water, at least one acid having an equivalent conductance at 15° C. in a 5% water solution of at least 100 and a catalytic amount of a member selected from the group consisting of hydrogen iodide and hydrogen bromide.

According to the foregoing equation, one gram-atom of cadmium metal is consumed for each mole of acrolein which is converted, and for best results, at least stoichiometric amounts of cadmium should be employed. It is preferred that the cadmium metal present in the reaction mixture be electrolytically deposited cadmium.

In order to achieve the optimum results in the process, acrolein should be added in the form of a dilute aqueous solution (not more than about 5 mole percent acrolein). Solutions containing less than 0.25 mole percent acrolein are operable, but offer no advantage in the process. In the continuous operation one way to insure that acrolein be present in dilute amounts is to add it gradually to the reaction mixture so that it reacts almost as rapidly as it is added.

Any unreactive liquid in which acrolein is soluble may be employed as a solvent; however, some water must be present for conductance. The preferred solvent from the standpoint of economics and availability as well as its excellent properties for this purpose is water.

Any molar ratio of feed acrolein to combined acid, in the range of 0.01 to 0.25 appears to give the best results. The preferred molar ratio of hydrogen iodide to sulfuric acid is in the range of from about 1:400 to 1:10 respectively.

The temperature at which the chemical reaction is carried out may vary in the range of from about 0° C. to about 110° C. and the preferred temperature range is from about 30° C. to about 90° C. The upper temperature limit, of course, is governed by the stability of the cell and reactor components under the conditions of reaction. In general, the chemical reaction is quite rapid at the higher temperatures in the range, and reaction times on the order of five seconds to two hours appear to be adequate in almost all cases for the completion of the reaction. The process is usually conducted at or near atmospheric pressure.

The electrochemical reaction taking place in the recovery of cadmium is believed to be reasonably represented below, using the preferred sulfuric acid-hydrogen iodide system:

Cathode: $Cd^{++}, SO_4^{--} + 2e \rightarrow Cd^{\circ} + So_4$

Anode: $H_2O(H_2SO_4) \rightarrow \frac{1}{2}O_2 + 2H^+ + 2e$

Net: $Cd^{++}, SO_4= + H_2O \rightarrow Cd^{\circ} + \frac{1}{2}O_2 + H_2SO_4$

In the anode compartment containing aqueous sulfuric acid, water is electrolyzed to produce molecular oxygen and hydrogen ion. The hydrogen ions, which are the current carriers, migrate through the ion exchange membrane to the cathode compartment and displace cadmium from its complex with acrolein, thereby producing the corresponding reduction product, allyl alcohol. In the instance where the chemical and electrochemical steps are carried out separately, the hydrogen ions remain in solution. This solution is recycled to the chemical reaction where the hydrogen ions react with the acrolein complex in the same manner as indicated above. The cadmium ions in the catholyte absorb two electrons from the cathode to form metallic cadmium.

The requirements for the preferred chemical-electrochemical cell useful in the preferred embodiment of the present invention include thorough mixing to provide good contacting of acrolein and cadmium and the formation of loose, relatively nonadherent, cadmium required for a high ratio of cadmium surface to the dissolved acrolein. Proper placement of stirrers and baffles and operation at relatively high current densities (50 amps. per square foot or higher), are required to produce the proper type of cadmium. Obviously, important to continuous long-term operation is the inertness of electrodes and other system components to the sulfuric acid and the oxygen evolved at the anode. The type and location of the anodes should be considered to minimize current consumption. Finally, an efficient product-recovery method is required in the over-all systems.

A number of electrochemical cells known in the art are useful herein but these all per se are not a part of the present invention. All that is required is a cell useful for simultaneous chemical conversion of unsaturated aldehyde to unsaturated alcohol and cadmium recovery which is typified by a cell having a horizontal cathode-vertical anode arrangement wherein a cationic exchange membrane is employed to isolate the anode and cathode compartments. This type of electrode arrangement eliminates the problems of cadmium aggregation and the transport of cadmium, and provides excellent contacting between cadmium and acrolein. The cathode may serve as the liner of the cell. In a particular embodiment of the present process a reaction of the foregoing description was employed wherein the cathode was aluminum and the anode was lead. Almost any conductive metal may be used for the cathode that is passive under the influence of cathode voltage. In the sequential operation of such a cell, however, cathode attack may occur when the current is discontinued and it is, therefore, often desirable to maintain a protective voltage at a very low level to prevent this from occurring. The material selected for the anode, however, must be resistant to the action of strong acids such as sulfuric acid under anodic oxygen, and such materials as lead dioxide, graphite, carbon, platinum or titanium, are among the useful materials.

It is preferred that the cathode and anode compartments be separated by a cationic permselective ion exchange membrane. In chemical composition these ion exchange membranes are similar to ion exchange resins and they usually contain a high concentration of an ion bound to a water-insoluble structure. In an aqueous salt solution, an equilibrium is established between the ions in the water in the membrane and the ions in the solution around the membrane. The presence of the bound ions limits the concentration of the mobile ions of the same charge in the aqueous phase in the resins. The ionic relationship is given by Donnan's equilibrium. A cationic membrane might have bound acid-type groups to give it the desired selectivity. Suitable cationic exchange membranes include Permutit 3142 and the like. Among the patents dealing with permselective membranes are the following: 2,636,851; 2,636,852; 2,681,319; 2,681,320; 2,702,272; 2,730,768; 2,731,408; 2,731,411; 2,731,425; 2,732,351; 2,756,202; 2,780,604; 2,800,445; 2,820,756; 2,827,426; 2,858,264; 2,860,096; 2,860,097; 2,867,575; 2,894,289; 2,903,406 and 2,957,206.

Any of the membranes disclosed in the patents in the foregoing list may be employed in carrying out the process of this invention. The durability of the membrane will, of course, vary depending upon the chemical composition but this affects only the length of time which will transpire before replacement is necessary.

As has been previously mentioned, two main types of ion exchange membranes are available, those that permit the passage of cations across them while excluding anions and those that are anion selective. Positively charged membranes are selective to anions and impervious to cations. Conversely, negatively charged membranes are selective to caitons and impervious to anions. Present day membranes consist of sheets of plastic material containing high concentrations of fixed, charged groups, either of the sulfonate type in cation-selective membranes or the quaternary amine type for anion-selective types. While the counter-ion is free to move from one fixed group to another, the charges on the anchored groups prevent ions of the same electrical sign from penetrating into the membrane. These permselective membranes are in fact ion-exchangers in sheet form. However, they are not subject to enrichment and stripping cycles. Instead, they act as selective barriers permitting the continuous, electrically motivated transfer of counter-ions for the desired separation. Heterogeneous membranes are sometimes made by milling ion-exchange beads with a binder, such as polyethylene, and extruding or calendering the sheet. One manufacturer impregnates polyethylene film with a warm mixture of the two chemicals, polymerizes with the aid of catalysts and then inserts the active groups; another slices thin sheets from a block of highly cross-linked styrene, divinyl benzene copolymer and treats them chemically; others incorporate a plastic mesh during polymerization or cast the material on such a mesh in order to provide greater mechanical strength.

As emphasized earlier, there are a number of ways in which the present process may be conducted. For example, the chemical reaction and the electrochemical reaction may be carried out in separate units and the recovered cadmium transported to the chemical reactor. Another mode of operaton may consist of carrying out the two reactions in the same unit, sequentially, in which case, the chemical reaction is completed before the current is applied to the cell. The cadmium is then regenerated after completion of the chemical reaction.

In the preferred method of operation of the process, acrolein is fed into the cathode compartment where, in the presence of a dilute acid, it chemically reacts with cadmium metal, which is constantly being reformed by electrolysis of the cadmium ion as shown by the above equation. Vigorous agitation is maintained in the cathode compartment so that a large excess of loose, nonadherent cadmium is available to attain a high cadmium-acrolein ratio. The products of reaction, allyl alcohol, propionaldehyde, and unreacted acrolein, may be removed from any point in the cathode compartment and separated by conventional means. However, for purposes of avoiding the removal of unreacted acrolein with the product, the process may be operated intermittently, with intermittent feeding of acrolein and discontinuation of the current.

The reacted and electrolyzed material need not be withdrawn and stripped until the end of the reaction. This can be a practical operation commercially because several cells may be used and timing staggered to produce stripper feed continuously. In a similar manner, continuous acrolein feed can be maintained in a multiple cell operation.

Cadmium recovery is essentially complete in this process. A balance exists between the cadmium consumed in the chemical reaction and that which is redeposited electrochemically.

The current densities in the electrolytic cell may vary within relatively wide limits. Generally, it may be stated that the current density should fall within the range of 10 to 1000 amperes per square foot, and a range of 30 to 500 amperes per square foot is preferred. A theoretical minimum of 2 Faradays of electricity are required to reduce one mole of acrolein and to form one mole of cadmium.

The following examples will illustrate the process of the present invention.

EXAMPLE I

The chemical reactions (data in Table I) were generally large scale reactions employing mechanical stirring of the electrolytic cadmium as well as the solution. Freshly distilled, uninhibited acrolein, either straight or as a 10 to 20 percent water solution, was added gradually to the system in the experiments. Addition time extended over a period 5 to 10 minutes short of the termination time. In the separate chemical-electrochemical operation, the organics were stripped from the reaction mixture and the remaining solution containing cadmium sulfate, sulfuric acid, hydrogen iodide and water was electrilyzed in an undivided cell.

*Table I*

| Molar Feed Ratio, Acrolein:$H_2SO_4$:$H_2O$:HI | Reaction Time (Min.) | Temp., °C. | Percent Per Pass Conversion | |
|---|---|---|---|---|
| | | | Allyl Alcohol | Propionaldehyde |
| 1:8:200:0 | 70 | 80 | 43.3 | 12.1 |
| 1:8:200:0.1 | 70 | 80 | 71.5 | 19.1 |
| 1:8:200:0.1 | 60 | 40 | 61.3 | 12.0 |
| 1:8:200:0.1 | 15 | 80 | 59.9 | 12.0 |
| 1:8:200:0.1 | 35 | 80 | 68.4 | 12.0 |
| 1:8:200:0.1 | 60 | 82 | 82.5 | 18.2 |
| 1:10:200:0.2 | 60 | 40 | 64.3 | 11.6 |
| 1:14:200:0.1 | 60 | 40 | 71.2 | 9.8 |
| 1:6:100:0.3 | 60 | 40 | 70.5 | 7.9 |
| 1:6:200:0.5 | 75 | 61 | 60.7 | 13.3 |
| 1:14:200:0.5 | 75 | 44 | 80.3 | 12.3 |

EXAMPLE II

In the sequential operation which was carried out in a horizontal cathode cell without the separation of the electrode compartments by means of an ion-exchange membrane, results similar to those described in Example I were obtained. The cell was first operated as a chemical reactor and then as a cadmium recovery unit on stripped electrolyte. An aluminum cathode and lead anode were utilized. After the chemical reaction was completed, the entire contents were removed, batch stripped in a conventional still, and the distilland returned to the cell anlong with any required water. Acrolein was fed during the chemical reaction as an aqueous solution. The electrolysis was conducted for the prescribed time, usually at 30–40° C. maximum temperature. Iodine, which formed early in the electrolysis and remained throughout until the current was shut off, was reduced back to iodide by allowing it to contact free cadmium for a short time. At this point, the system was ready for the next cycle. After the first few experiments, a water flush of the cadmium after the chemical reaction was instituted to remove organics held up in the granular cadmium. This operation eliminated contamination of the electrolytic reaction by organics.

EXAMPLE III

In a manner similar to that described in Example I the simultaneous chemical and electrochemical operation was carried out in a cell having a lead anode and an aluminum cathode. The anode and cathode compartments were separated by means of a cationic ion exchange membrane. The cationic exchange membrane was prepared as follows:

A mixture of about 95 parts by weight of styrene and about 5 parts by weight of divinyl benzene was polymerized. The resulting polymer was comminuted to fine particles and 100 parts by weight of this finely-divided material was sulfonated by reaction with 175 parts by weight of chlorosulfonic acid. The latter reaction was carried out by heating at reflux temperature for about 3 minutes and then maintaining the mixture at room temperature for 50 hours. The sulfonated product was then washed with a large excess of water to remove any remaining chlorosulfonic acid and any acid chlorides which were formed in the reaction. The sulfonated resin was then dried and 2 parts by weight of the dried resin were mixed with 1 part by weight of polyethylene and the resulting mixture was processed into a sheet which then serves as the cationic permselective membrane.

The catholyte was an aqueous mixture of the indicated acid and catalyst (HI), while the anolyte contained the indicated acid and no catalyst. Acrolein was fed during the chemical reaction as an aqueous solution. Chemical reaction was started with only a trickle of current imposed on the cell. Five minutes after the chemical reaction was under way, electrolysis was begun at the predetermined current density. An electric current density of 100 amps/sq. ft. was passed at about 4.1 volts across the cell. Reacted and electrolyzed materials were not withdrawn and stripped until completion of the reaction. The results are shown in Table II.

In this and the previous examples acrolein and propionaldehyde were analyzed by vapor chromatography using a 40% polyethylene glycol on firebrick column, four meters in length. The Perkin-Elmer model 154–B vapor fractometer was used throughout.

The most reliable allyl alcohol analysis involved the use of a three meter THEED column (tetrahydroxy ethyl ethylene diamine) and a Perikn-Elmer model 154–D vapor fractometer. The analysis was performed at 105° C. on a 0.02 ml. sample. Because the THEED column, unsuitable for aldehyde analysis, and a polyethylene glycol column had to be used for this purpose, the two columns were set up in such a manner that they both communicated with a common recorder.

Determinations of cadmium recovery efficiency were made by a carbonate method involving the precipitation of cadmium carbonate with excess saturated aqueous $NaHCO_3$ solution. The precipitate was filtered through a fine porosity filter crucible and washed with aqueous $NaHCO_3$ solution followed by a small amount of water. The precipitate was dried at 120° C., and the weight of cadmium carbonate was determined. A cross-check was occasionally made on cadmium by washing and drying that which remained at the end of the run and comparing its weight to the initial weight of the cadmium.

*Table II*

| Molar Feed Ratio, Acrolein: $H_2SO_4$:$H_2O$:HI | Total Reaction Time (Min.) | Temp., °C. | Percent Per Pass Conversion | | Cadmium Recovery Efficiency, Percent |
|---|---|---|---|---|---|
| | | | Allyl Alcohol | Propionaldehyde | |
| 1:8:200:0.5 | 70 | 61 | 59.7 | 14.9 | 87 |
| 1:6:200:0.5 | 75 | 61 | 60.7 | 13.3 | 82 |
| 1:14:200:0.5 | 75 | 40–48 | 80.3 | 12.3 | 94 |
| 1:8:200:0.1 | 75 | 75–80 | 67.0 | 11.3 | 93 |
| 1:14:200:0.5 | 70 | 40–47 | 69.3 | 13.0 | (1) |
| 1:8:200:0.5 | 66 | 42 | 57.9 | 14.3 | (1) |

[1] Not determined.

EXAMPLE IV

When the procedure of Example I was repeated using a feed of acrolein, HCl, $H_2O$ and HI in the molar ratio of 1:8:200:0.1 respectively, a reaction time of 60 minutes and a reaction temperature of 80° C., a per pass conversion of acrolein to allyl alcohol of 58% was obtained.

EXAMPLE V

Results similar to those given in the proceding examples were obtained when methacrolein and crotonaldehyde were substituted for acrolein and HBr was substituted for HI.

We claim:
1. The process for the manufacture of an olefinically unsaturated alcohol comprising chemically reacting an olefinically unsaturated aldehyde with a mixture of cadmium, water, an acid having an equivalent conductance in a 5% water solution at 15° C. of at least 100 and a catalyst selected from the group consisting of hydrogen bromide and hydrogen iodide and simultaneously regenerating the cadmium in situ electrolytically at a cathode in contact with said mixture.
2. The process of claim 1 wherein more than one gram atom of cadmium is used per mole of olefinically unsaturated aldehyde.
3. The process of claim 2 wherein the olefinically unsaturated aldehyde is acrolein and is present in the water in no more than about 5 mole percent.
4. The process of claim 3 wherein the molar ratio of acrolein to combined acid is from 0.01 to 0.25.
5. The process of claim 4 wherein the molar ratio of catalyst to acid is from about 1:400 to about 1:10 respectively.
6. The process of claim 5 wherein the temperature is from about 0° C. to about 110° C.
7. The process of claim 6 wherein the electrochemical reaction is carried out at a current density of from 50 to 1000 amperes per square foot.
8. The process of claim 7 wherein the acid is sulfuric acid and the catalyst is hydrogen iodide.
9. The process of claim 7 wherein the acid is hydrochloric acid and the catalyst is hydrogen iodide.
10. The process of claim 2 wherein the olefinically unsaturated aldehyde is methacrolein, the acid is sulfuric acid and the catalyst is hydrogen bromide.
11. The process of claim 2 wherein the olefinically unsaturated aldehyde is crotonaldehyde, the acid is sulfuric acid and the catalyst is hydrogen bromide.
12. The process for manufacture of an olefinically unsaturated alcohol comprising simultaneously reacting a mixture of cadmium, alpha,beta-olefinically unsaturated aldehyde containing from 3 to 8 carbon atoms, water, at least one acid having an equivalent conductance at 15° C. in a 5% water solution of at least 100, and a catalytic amount of a catalyst selected from the group consisting of hydrogen bromide and hydrogen iodide in the cathode compartment of an electrolytic cell containing cathode and anode compartments separated from one another by a cationic permselective ion exchange membrane under a current density of at least 50 amperes per square foot, regenerating in situ the cadmium and recovering the olefinically unsaturated alcohol from said mixture.
13. The process of claim 12 wherein the alpha,beta-olefinically unsaturated aldehyde is continuously fed into the cathode compartment and the reaction product is continuously removed from the cathode compartment.

References Cited by the Examiner
UNITED STATES PATENTS

| | | | |
|---|---|---|---|
| 1,799,157 | 4/1931 | Drouilly | 204—10 |
| 2,558,750 | 7/1951 | Harrison | 204—10 |
| 3,109,865 | 11/1963 | Foreman | 260—638 |

OTHER REFERENCES

Exner: Journal American Chemical Society, vol. 25 (1903), pages 902–903.

JOHN H. MACK, *Primary Examiner.*

MURRAY TILLMAN, WINSTON A. DOUGLAS,
*Examiners.*